United States Patent
Smith et al.

(10) Patent No.: US 9,819,159 B2
(45) Date of Patent: Nov. 14, 2017

(54) LOW PROFILE VARIABLE FREQUENCY CONTROLLER WITH COOLING AND PROCESS

(71) Applicants: Lewis T. Smith, Carmichael, CA (US); Rohan Kumar, Sacramento, CA (US); Gnia Vang, Sacramento, CA (US)

(72) Inventors: Lewis T. Smith, Carmichael, CA (US); Rohan Kumar, Sacramento, CA (US); Gnia Vang, Sacramento, CA (US)

( * ) Notice: Subject to any disclaimer, the term of this patent is extended or adjusted under 35 U.S.C. 154(b) by 186 days.

(21) Appl. No.: 14/756,892

(22) Filed: Oct. 26, 2015

(65) Prior Publication Data

US 2017/0117687 A1    Apr. 27, 2017

(51) Int. Cl.
*H02B 1/56* (2006.01)
*G01F 1/05* (2006.01)
*F04D 19/00* (2006.01)

(52) U.S. Cl.
CPC ............. *H02B 1/56* (2013.01); *F04D 19/002* (2013.01); *G01F 1/05* (2013.01)

(58) Field of Classification Search
CPC .......... H02B 1/56; H02B 1/565; H02B 11/02; H02B 11/00; H02B 11/18; H02B 13/00; H02B 11/04; F04D 19/002
See application file for complete search history.

(56) References Cited

U.S. PATENT DOCUMENTS

| | | | |
|---|---|---|---|
| 7,558,052 B1* | 7/2009 | Coomer | H02B 11/02 200/306 |
| 2004/0007348 A1* | 1/2004 | Stoller | H02B 1/565 165/47 |
| 2005/0016195 A1* | 1/2005 | Bretschneider | H05K 7/20609 62/263 |
| 2005/0128722 A1* | 6/2005 | Miller | H04Q 1/06 361/797 |

* cited by examiner

*Primary Examiner* — David M Sinclair
*Assistant Examiner* — Robert Brown
(74) *Attorney, Agent, or Firm* — Mark C. Jacobs (57) ABSTRACT

A housing for a variable frequency drive and its transformer, which housing has two compartments, one each for a VFD and transformer. The housing is box shaped with enclosures attached to the rear wall of each compartment, which enclosures communicate through openings in the compartments to their interiors. The VFD compartment has an exterior side wall communicating enclosure. Cooling components are disposed in each enclosure. Each compartment has inner and outer doors. The inner door of the VFD compartment has a recessed cabinet with VFD controls therein and on its door. The inner door of the transformer compartment has a grill, while its outer door has both interior and exterior louvers. The transformer compartment also holds the main circuit breaker.

29 Claims, 9 Drawing Sheets

LOW PROFILE VARIABLE FREQUENCY CONTROLLER WITH COOLING AND PROCESS

RELATION TO OTHER PATENT APPLICATIONS

Not applicable

FIELD OF INVENTION

This invention relates to an enclosed, metered, low profile harmonic free variable frequency drive for water and wastewater pump applications without the need for refrigerated cooling of the VFD

BACKGROUND OF THE INVENTION

In the year 2002 Kabushiki Kaisha Toshiba of Kawasaki Japan was issued U.S. Pat. No. 6,396,723 for an invention entitled Rectifier and Transformer Thereof. This invention was developed for use in situations where cooling was either not an issue or if needed in a particular operating environment, a cooling mechanism could be added to ensure that the unit operated safely within its known operating parameters. This product was not originally designed to be utilized by the water and wastewater industry.

A large portion of the assignee of this application's business concerns products for the water and wastewater industry. Applicants were of the opinion that this new full-wave rectifier that converts three phase AC current into DC and also has a transformer that outputs AC current in six phases in a very specific manner, and wherein the current flowing in the DC line through the transformer can be reduced to ½ of the whole in the case of an 18 pulse rectifier, whereby the capacity of the transformer can be reduced as well as its physical size is capable of being reduced, might have applicability in the water and waste water industry if certain issues could be resolved.

The big issue to be resolved, is the ability of the CCD (Toshiba) unit to be operated without the need for added refrigerated air cooling. The primary reasons for wanting to eliminate air conditioning is the major expense of the extra power needed to cool the Toshiba VFD as well as the fact that the use of the VFD would often take place in remote areas where third party air conditioning maintenance might be difficult to obtain, and if obtainable, again might be untimely or extremely costly due to the location of the VFD.

There was a need therefore for the ability to use this new unit of Toshiba in the environments associated with water and wastewater treatment plants in the warm climates of especially California, Arizona, Texas and New Mexico.

SUMMARY OF THE INVENTION

An enclosed, metered, low profile harmonic free VFD for water and wastewater pump applications without the need for refrigerated cooling and the detriments associated therewith. The upside of this invention include its long mean time between failures, more efficient use of power, and long life of the industrial rated VFD.

It is a first object of this invention to provide a variable speed drive for the water and waste water industry that uses forced air blowers and heat exchanger components cooling.

It is a second object to provide a lower profile VFD for the water and wastewater industry that is more energy efficient than prior art VFDs.

It is a third object to provide a VFD for the water and wastewater industry that has an extended usable lifetime.

It is a fourth object to provide a VFD that has a longer mean time between failures.

It is a fifth object to provide a more power efficient VFD for the water & wastewater industry that is rated for operation at 50 degrees Celsius, without refrigerated cooling.

It is a sixth object to take a VFD developed for and normally intended for use in the mining and oil and gas production industries, and adapt it for use in the water and wastewater industry.

These and other objects of the invention will in part be obvious and will in part appear hereinafter. Further objects of this invention will become apparent from a careful reading of the detailed description provided herein as well as from review of the drawings The invention accordingly comprises the apparatus possessing the features, properties and the relation of components which are exemplified in the following detailed disclosure and the scope of the application of which will be indicated in the claims.

DESCRIPTION OF THE PREFERRED EMBODIMENT

FORWARD—Applicants' assignee is not in the large electrical component business, wherein industry leaders include TOSHIBA, HITACHI, SIEMENS and GENERAL ELECTRIC. Rather applicants' assignee is an integrator. It is a specialty integrator for the water and wastewater industries. Its customers include water districts, such as the COACHELLA VALLEY WATER DISTRICT, and MUNICIPALITIES which distribute water and collect and treat wastewater. Applicants' assignee utilizes components from various manufacturers to create integrated systems for the movement (pumping) of water and the treatment thereof.

Thus applicant utilizes and often modifies electrical components of large electrical component manufacturers to operate in specific functions under certain operating parameters. Applicants' found that the KABUSHIKI, KAISHA TOSHIBA, hereinafter TOSHIBA, rectifier and transformer of U.S. Pat. No. 6,396,723 offered a full wire rectifier that converts three phase AC current into DC current, and that the transformer of this invention outputs AC of 6 phases, This apparatus is so constructed that the transformer used with the rectifier can be reduced relative to normal for an 18 pulse rectifier since the current flowing in the DC line through the transformer has been reduced. Less current equals less heat.

This patented apparatus was originally designed for use in the mining and oil and gas production industries. It was designed to operate at temperatures as high as 50° C., which is 122° F. The specification of the TOSHIBA patent U.S. Pat. No. 6,392,723 is herein incorporated by reference.

Water and wastewater operations are most often public entities, and as such are mandated to keep costs down, yet need to operate efficiently and reliably.

The mandate of applicants' was to determine how to take a very efficient variable frequency drive (VFD) that could operate under extreme conditions, and make it suitable for use by the water and wastewater industry without the need for refrigerated cooling. Thus the object of the project was to develop an enclosed, metered, low profile VFD for water and wastewater pump applications with no refrigerated cooling requirement. Thus the desire was to find a way to replace vertical VFDs with large refrigerated A/C units that require weather wrapping, or a shelter or building.

The object was to develop a VFD for the served industry that would have longer times between failures, and be more power efficient, which would result in a longer life industrial rated VFD to control variable speed pumps for use by the water and wastewater industry.

The completed drive of this invention consists of (A) the enclosure, (B) optional metering, (C) cooling elements, (D) optional control system and (E) the basic drive.

The enclosure employed, 11, is divided in two zones, the drive zone 13, and the transformer zone 14. The transformer zone has a single exterior door 12C, while the drive zone has double french type doors used since the doors are opposed in hinging, both closing to the center.

Figure 4:
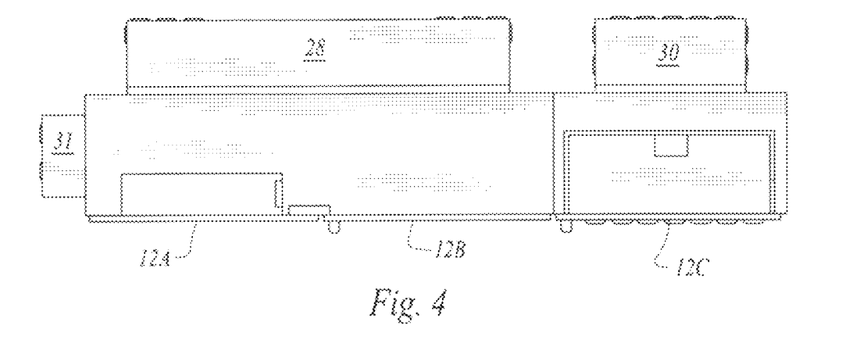

The basic housing is a free standing NEMA 3R cabinet, partially open at the bottom as will be discussed infra, We utilize a hot tipped galvanized steel construction, that is powder coated inside and out. A seamless construction is employed with all seams continuously welded and ground smooth. Housings of this type are designed to protect electrical and electronic controls, components and instruments in industrial environments. Enclosures of this type are available in various sites to fit different needs. The modified housing of this invention can be seen generally in the top plan view FIG. 4 which shows the housing having two compartments with 3 enclosures attached to the two compartments.

Requirements of Various Customer Entities

As mentioned earlier, there are two zones to the enclosure. The main zone 13 holds the basic drive components, while the second or right side zone 14 holds the transformer utilized with the Toshiba supplied rectifier, a typical enclosure suitable for modification for use in this invention is a suitably sized TESCO CONTROLS T-24-000 enclosure.

Figure 5:
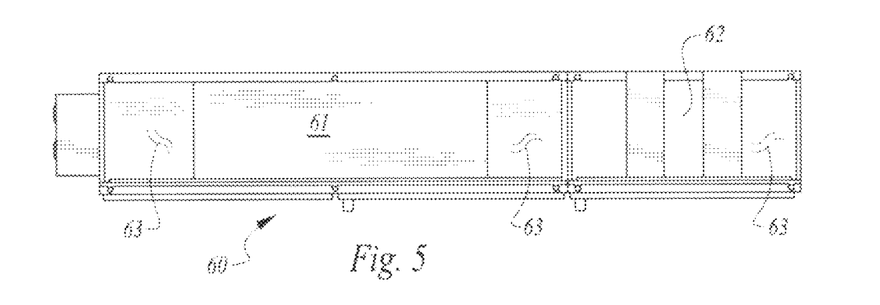

Prior to discussing the two compartments of the apparatus, let us briefly visit FIG. 5. This FIG. 5 illustrates a generally rectangular metal beam base 60 having a concrete or metal floor sections 61 and 62. The base 60 is designed for disposition at the user's facility. A trio of power conduits face the gravel beneath for the feeding of conduits and power lines from a distance to the apparatus enclosure 11. Bases of this nature are conventional in the electrical utility industry as places through which electricity cables are brought to cabinets having components therein.

Figure 1:
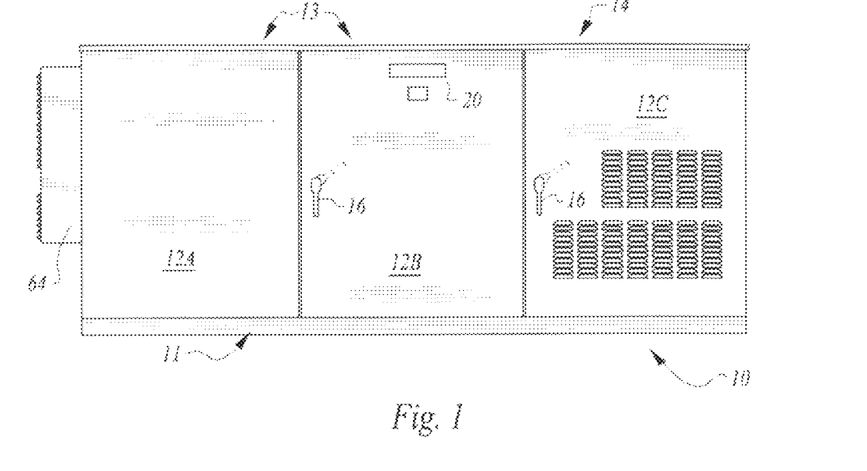
FIG. 1 Is a front elevational view of the variable frequency drive housing of this invention, with all doors closed FIG. 2 Is a rear elevational view thereof FIG. 3 Is a right side elevational view of the exterior of the housing FIG. 4 Is a top plan view of the housing base with the housing's roof and components removed. It is actually a sectional view of the lower portion of the housing FIG. 5 Is a top plan view of the base upon which the housing is installed FIG. 6 Is a front perspective view of the housing without its base and the VFD is not shown.
Figure 6:
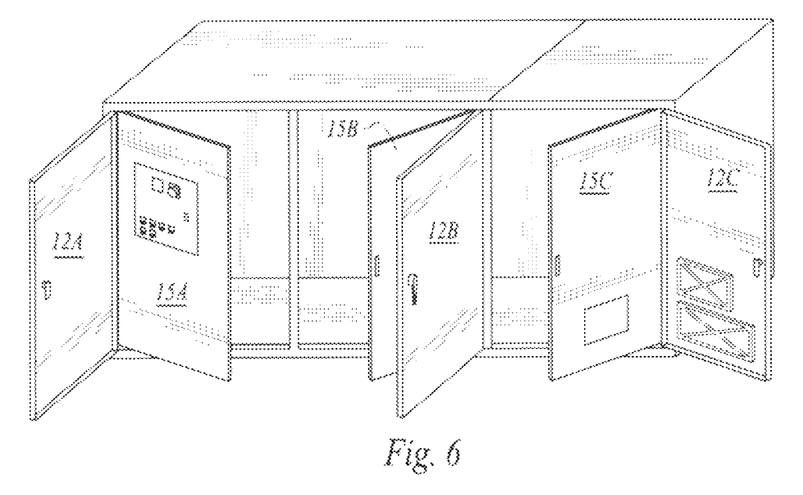
Figure 14:
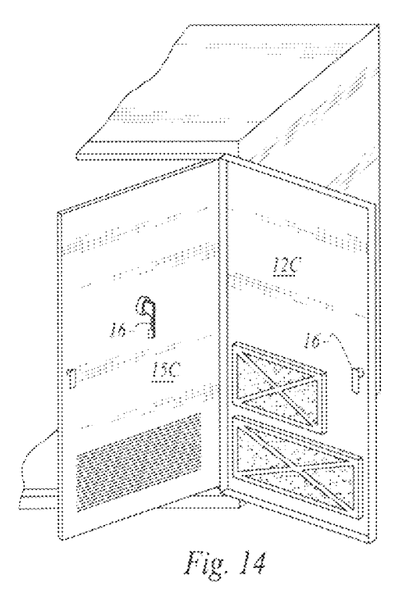
FIG. 14 Is a partial elevational view of the interior surface of the right hand outer door and the outer surface of the right side inner door.
Figure 15:
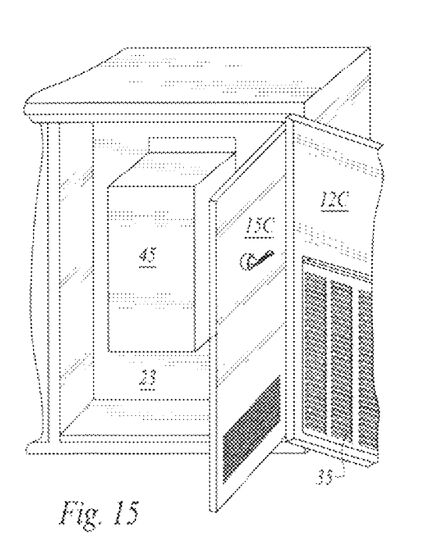
FIG. 15 Is an interior view of the transformer compartment of this invention

Referring now to FIG. 1 and FIG. 6, it is seen that the transformer zone 14 of the housing of this invention has a single outer door 12C, and a single full panel inner door 15C. See FIG. 14. Each of the two doors has a conventional handle closure, 16, thereon.

Exterior door 15C has at its lower end two areas of metal louvers in rectangular arrays, see FIG. 1. On the inside of said outer door is a pair of filter medium frames, 18, with conventional air filter media disposed therein. See FIG. 14. Inside the transformer compartment 14, is a conventional 480 volt multi-phase transformer, sized and specified by the customer in conjunction with applicants' assignee, to meet the needs of the specific job. It is within the skill of the art to determine a suitable transformer that is compatible with the specific VF drive employed, and the needs of the customer.

The discussion now moves to the drive zone of compartment 13. The outer doors of zone 13 are seen in closed position of FIG. 1. The doors are hinged opposed such that when in open position the entire zone interior may be seen with its contents. Thus reference is made to FIG. 13. The right outer door 12B has a locking handle 16, thereon and a COG, 19 which is the center of gravity information for a fork lift user when moving this apparatus. Optional signage 20 of a conventional nature may be applied to either outer door of this compartment for identification and reference purposes which might include the name of the owner entity and its emergency phone number. The left outer door 12A, is a conventional metal solid panel door of a NEMA 3R nature, sized properly for the project.

Figure 7:
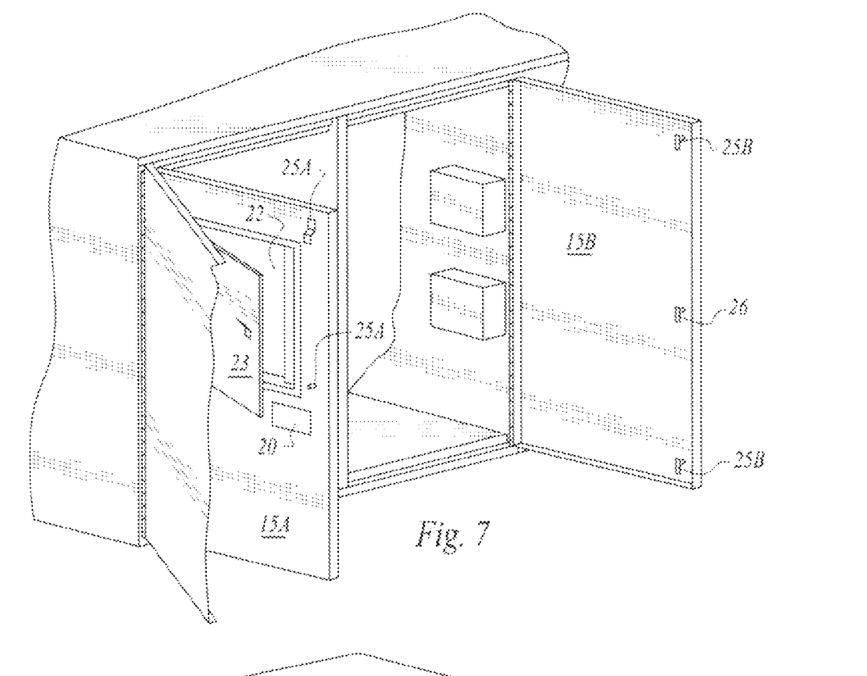
FIG. 7 Is a partial interior front view of the housing showing both outer doors open FIG. 8 Is a perspective view of the left inner door with its recessed control compartment door open.

Compartment 13 also has two half width inner doors, 15A and 15B, see FIG. 7. These are piano hinged in opposed fashion, one swinging left and one swinging right. Interior door 15A has a recessed control compartment 22 therein. Compartment 22 has its own door 23 with a suitable closure thereon. The recessed compartment with its door and controls mounted in the compartment may be switched to the right side inner door 15B if so desired.

Figure 8:
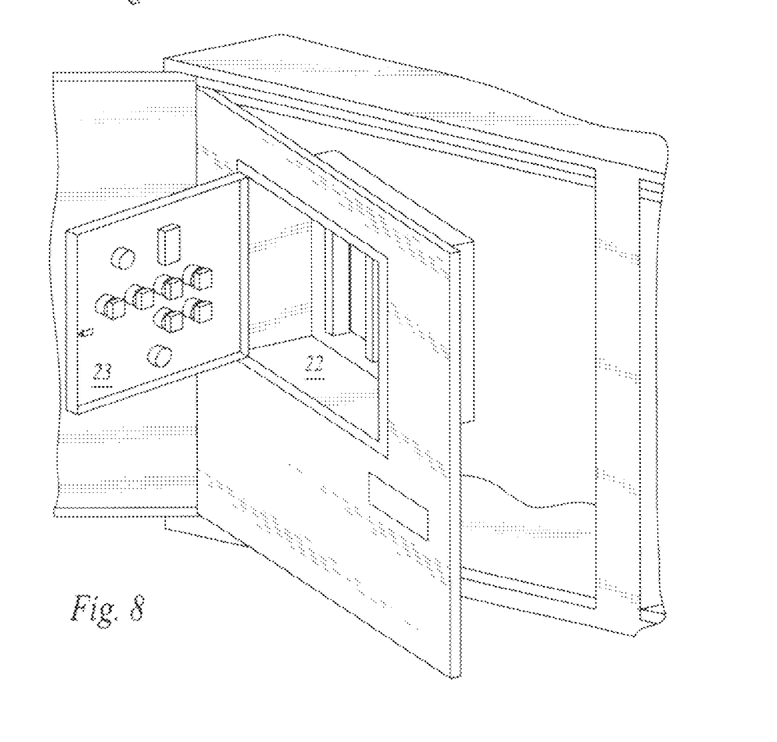

Compartment 22, per FIG. 8 is built into door 15A, and may be formed integrally or welded to an opening of suitable size, both of which are conventional manufacturing techniques. Inner door 23 has a safety closure 24, connected electrically to the high voltage portion of the base drive in compartment 13, to automatically shut down the 480 VAC power, which is lethal if touched, such a safety switch is conventional in the high voltage electrical/electronic industry. Signage 20 calls the user's attention to that fact. A trio, though more or less can be employed, of inner french door closures are vertically aligned and disposed for engagement. One portion 25B on door 15B mating to a portion 25A on door 15A.

Figure 9:
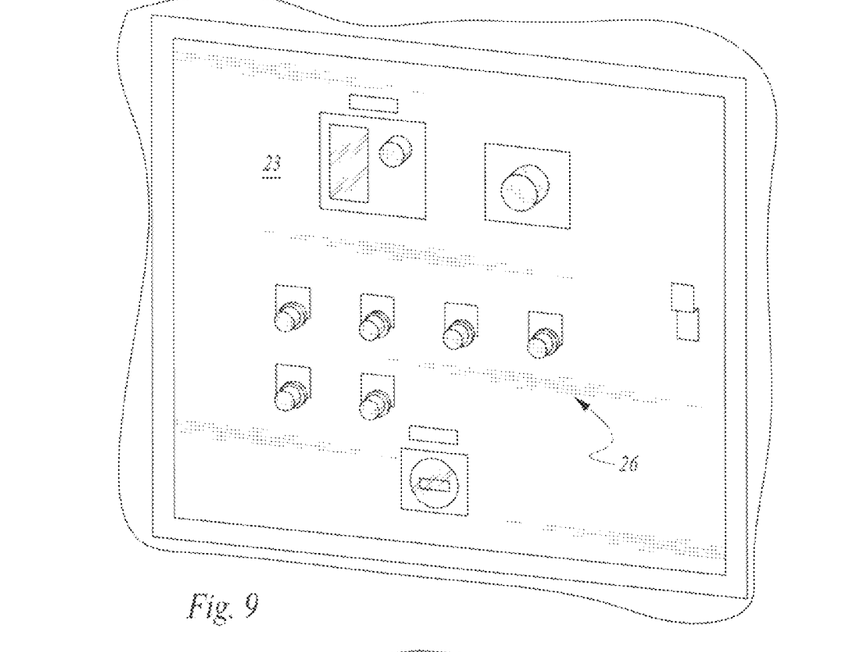
FIG. 9 Is an elevational view of the controls compartment door of the left inner door
Figure 10:
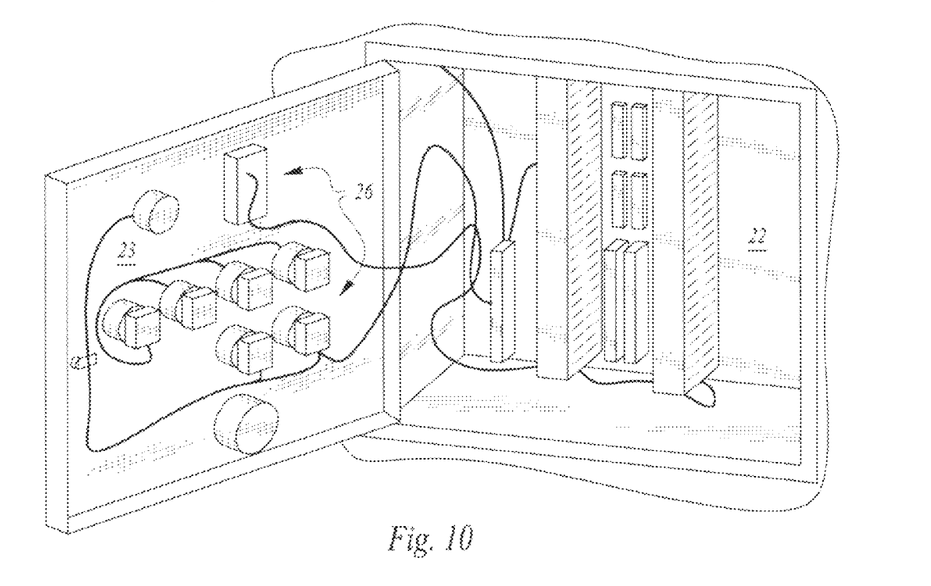
FIG. 10 shows the controls wiring from the opposite side of the door of FIG. 9, connected to recessed compartment components, and to other components.

As seen in FIG. 8, disposed within the recessed compartment 22 are many electrical components, while disposed on the front face of compartment door 23 are various switches and controls, 26, used in conjunction with the variable frequency drive . See also FIG. 9, The inter-connection wiring of the controls of FIG. 9, can be seen leading from the rear of door 23 in a wire harness, through the compartment wall to various aspects of the rectifiers, see FIG. 10 which is related to FIG. 7, as well, which depicts the interior of the small compartment 22 behind door 23. Switches and controls, 26 may vary in nature according to the needs of the customer. Compartment 22 houses all control components, including but not limited to relays, terminal blocks, time relays, PLCs as well as push buttons, pilot lights, hand switches and LCD displays. The exact nature of each of the controls is within the skill of the art and such electrical components do not form part of this invention, as they will vary from inventive unit to inventive unit depending upon the requests of the customer. Some customers for example may want LED displays of various colors, instead of a digital LCDs.

Figure 2:
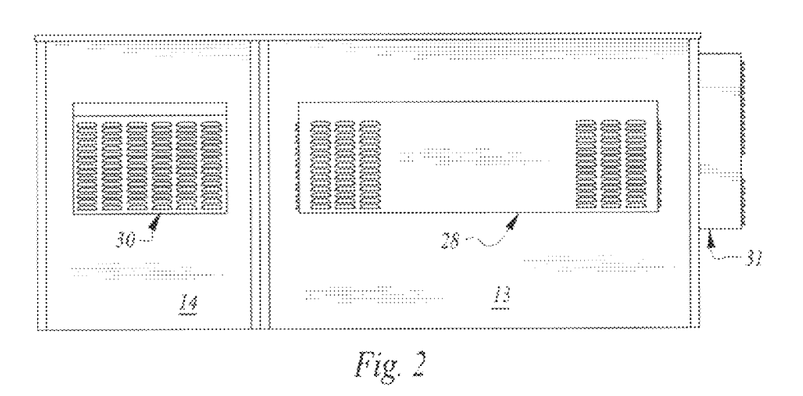
Figure 3:
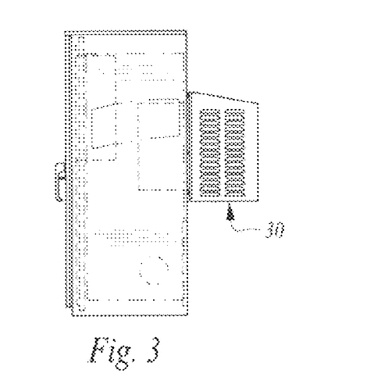
Figure 11:
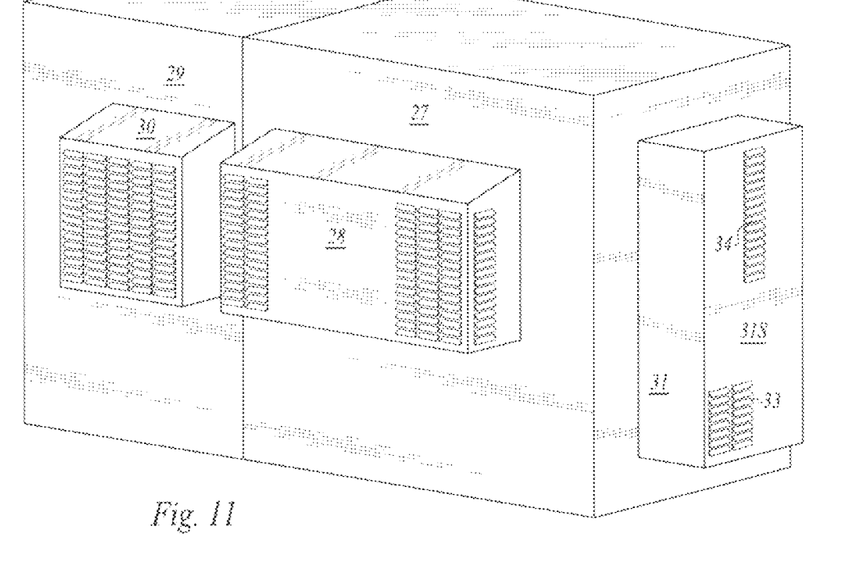
FIG. 11 Is a rear and left side perspective view of the housing of this invention FIG. 12 Is a rear and partial right side perspective view FIG. 13 Is a front elevational view of the housing interior, showing the variable frequency drive mounted spaced up from the bottom surface of the housing.
Figure 12:
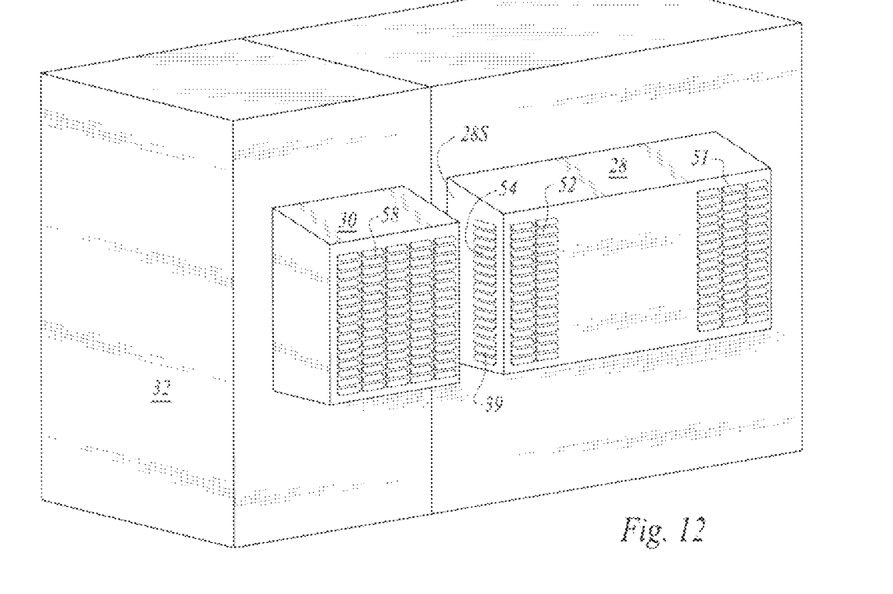

Reference is now made to FIGS. 2, 11, and 12, wherein FIG. 2 is a rear elevational view of both compartments showing the cooling enclosures mounted on the rear wall of each of the drive and the transformer compartments. The cooling enclosure 31, on the left side of the TAE drive compartment is also seen with the afore mentioned enclosures 28 and 30 are alone in perspective in the rear view FIG. 12 where a portion of the right wall 32 of transformer compartment 14 is also seen.

The wall that separates the two compartments is designated 33 and is seen in FIG. 11 with wire harnesses entering suitable openings 34.

Each of the enclosures 31, 28 and 30 seen in FIG. 11, are seen to be metal boxes open on the face each of which abuts a suitably sized opening into which the enclosure is bolt mounted to flanges unseen, extending from each respective opening. Such a mounting mode is conventional in the sheet metal art.

As can be seen in each of these three views, a series of louvers are set out on each rear wall of the respective enclosure, though which heat can escape. On enclosure 31, a series of slots configured as a circle 33, serve as a warm air port for a fan mounted interiorly of the opening, but the fan can not be seen in FIG. 11. A series of horizontal slots vertically disposed are seen in side wall 31S of enclosure 31.

In FIG. 12, louvers are seen present on interior side wall 28S of the enclosure mounted on the rear of the drive compartment.

Figure 13:
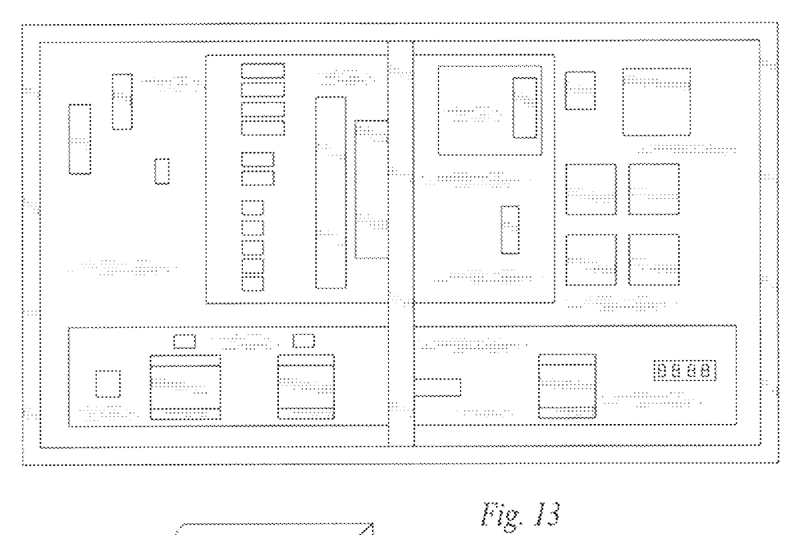

FIG. 13 is a front elevational view of the variable frequency drive and all of its related components. Note however, that is beyond the scope of this invention to delve into the details of the housing's contents, as the invention relates to the housing per se.

Figure 16:
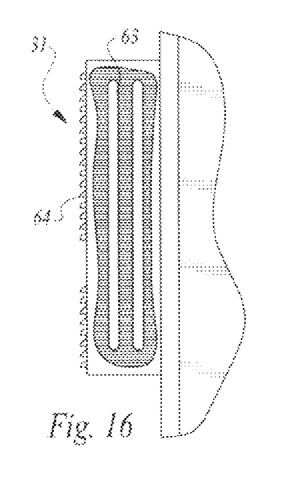
FIG. 16 Is a cutaway view from the rear of enclosures 28 and 30 to show the cooling devices disposed therein.

Moving forward to FIG. 16, there is seen a cutaway view of the contents of the enclosure 31 mounted on the left side of the drive compartment. Behind the enclosure is a heat exchanger 63 to dissipate heat through the downward facing louvers 64 on the enclosure 31's side wall. See further discussion relative to FIG. 17.

It is to be seen that the fan size and type of heat sinks and other cooling system components can vary with the type and size of the basic drive and the associated transformer as dictated by the specification of the customer for his operating environment.

Figure 17:
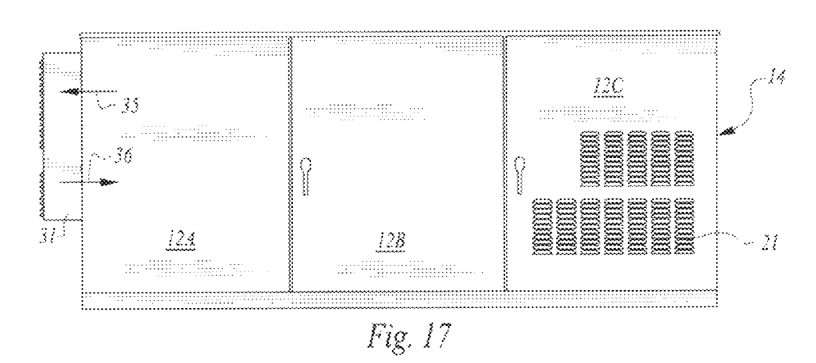
FIG. 17 is a diagrammatic front elevational view of the cabinet of this invention.

The discussion now moves to FIG. 17, which is a diagrammatic view related to FIG. 1. Here the left side enclosure 31 is seen, which houses a heat exchanger therein to provide cooling to the VFD by exchanging internal air with the external air through the use of an aluminum core heat exchanger. Such heat exchangers are sold under the Hoffman brand by Hoffman Enclosures, Inc. D.B.A. Pentair Technical Products . Note the air direction as shown by arrows 35 and 36. The temperature drop to be accomplished by the heat exchanger will vary depending upon the external temperature of the operating environment. The greater the delta between in side and oat, the greater the degree drop.

Figure 20:
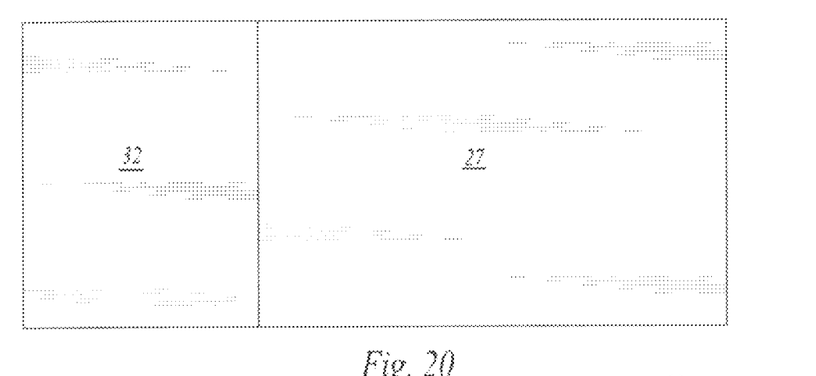
FIG. 20 is a rear exterior door of an off the shelf Tesco Controls T-24-000 enclosure prior to the adaptation to this invention.

The transformer compartment 14 is also seen here. The outer door 12C has a series of air openings or louvers. Two 11 inch fans, not seen here, but whose location can e seen in FIG. 20 are mounted on the interior of the rear wall of the enclosure to pull air in through the louvers 21.

Figure 18:
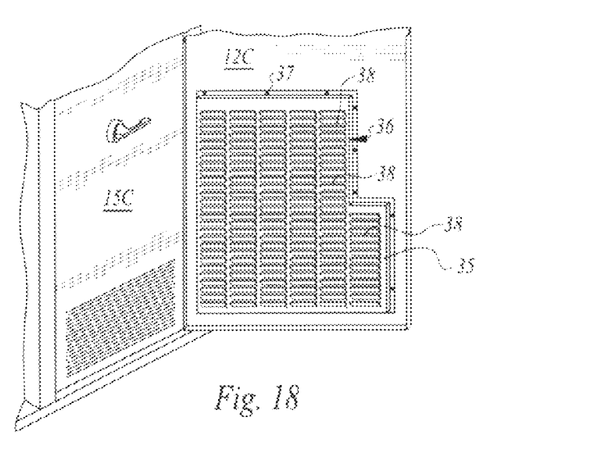
FIG. 18 is an elevational view of the far right interior door outer face and the far right exterior door inner face.

In FIG. 18, The inner doors as discussed aforesaid, provide a physical safety barrier for operators of the apparatus to protect them from the lethal 480 VAC. To ensure user safety, when power is applied to the VFD, obviously the main circuit breaker is closed, the opening of any of the three inner doors will activate a switch unseen, which will trip the main breaker in the transformer section behind door 15C to shut down the apparatus. Door 15C is seen here closeup is a flat panel with a grill 35, of sheet metal perforations therein for ventilation. Procedures to provide perforations of this nature are well known to the art. In FIG. 17, the right hand door 12C is seen on its exterior to have two sets of downward facing louvers, 21. On the interior face thereof, is a filter holder frame 36, which is of an open box configuration and mounted to the interior of door 12C by bolts 37. A series of upward facing louvers are seen disposed in face 36A of the frame 36 offset from the door surface. These louvers 38 face upward. Disposed between frame 36 and the interior surface of door 12C is a filter media such as spun metal. The area of the filter frame is coextensive with the area of he downward facing louvers on the front surface of door 12C. Thus there is air flow through the grill 35 of the outer door through the exterior louvers 21, through the filter media 39, through the inner louvers 38 into the transformer area.

Figure 19:
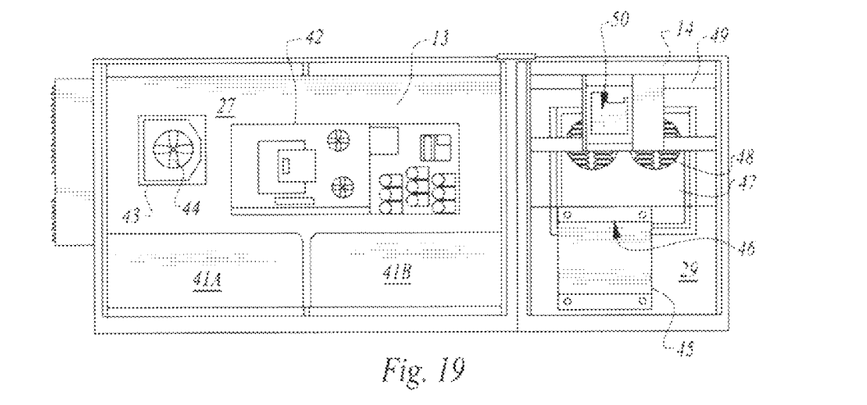
FIG. 19 is an interior view of the cabinet with both inner and outer doors removed.

FIG. 19 is a front elevational view of the apparatus with all inner and all outer doors removed. The view is from the front of the apparatus. In the left compartment 13, are seen a pair of spaced back panels mounted to the floor of the compartment upon which are mounted electrical components needed for the operation of the VFD, such as but not limited to the Toshiba HX7 Plus , designated 42. The VFD is suitably mounted in the compartment according to the specification of the manufacturer.

On the rear wall 27 of compartment 13 a fan mount board with an opening therein, unseen, and which opening is covered over by the presence of fan 44. The fan's purpose is to blow air through the heat sink of the Variable Frequency Drive.

In the transformer compartment 14, an 18 pulse transformer, 45, matched from the vendor is mounted to the floor of the compartment 14. A pair of vertically spaced conventional component mounting bars are conventionally attached to the opposed sidewalls of the compartment 14. To these bars 49, the main circuit breaker 50 is physically mounted.

At this point a timeout is taken to advise the reader that all the electrical components, fans, the VFD, the transformer and the interlocks to trigger the main breaker are electrically connected either according to the specification of the manufacturer or as would be done conventionally. However the details of the electrical connections will not be recited as such are beyond the purview of this patent application whose subject matter primarily is the cabinet for housing the VFD and transformer to operate in the environment as set forth previously, that is without the need for refrigerated air.

On the rear wall 29 of compartment 14, a fan mount board 47 having two horizontally spaced fan circular cutouts therein 48 is attached to the rear wall 49. Two eleven inch cooling fans not seen, are to be attached to these openings.

We now turn to the rear wall exterior faces, 27 & 32 respectively of the two compartments 13 and 14. FIG. 20 depicts the rear wall of the unmodified NEMA 3R cabinet referred to infra. It is simply two painted metal sheet metal panels, and nothing else.

Figure 21:
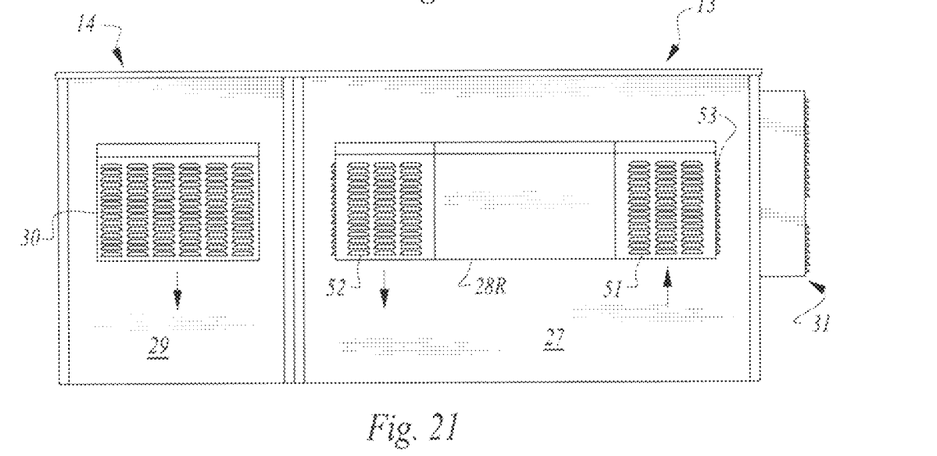
FIG. 21 is a rear exterior view of the cabinet of this invention.

We now move to FIG. 21, which shows the modified rear exterior panels, 27,29 of the compartments 13 & 14 respectively. The VFD, the larger of the two compartments has an enclosure 28, mounted over a suitable opening in and extending away from rear wall 29. The two side walls 28, per FIG. 12 have a series of downward facing louvers thereon. On the rear surface thereof 28R on opposite ends of the enclosure there are also a series of downward facing louvers, 51 and 52. Between these spaced louver sets is the space for the integral heat sinks of the VFD, not seen.

The transformer compartment enclosure 30 is mounted in a suitable opening in the rear wall 29 of the compartment 14. Here too from the outside a series of downward facing louvers are seen. Behind these louvers will be found the two 11 inch fans mentioned previously, the space for which is seen from the front vantage point in FIG. 19. Thus hot air exits the transformer compartment from the fans and blows out through the louvers. Whereas in the VFD compartment's enclosure 28, cool external air is sucked in through the louvers on the right in the rear vantage point, designated 51, as well as the right side surface of the enclosure, 53 blows across the VFD heat sink, and exits out the louvers on the left end of the enclosure, 52 and the louvers 54 on the left side of the enclosure 28 as seen in FIG. 12.

Figure 22:
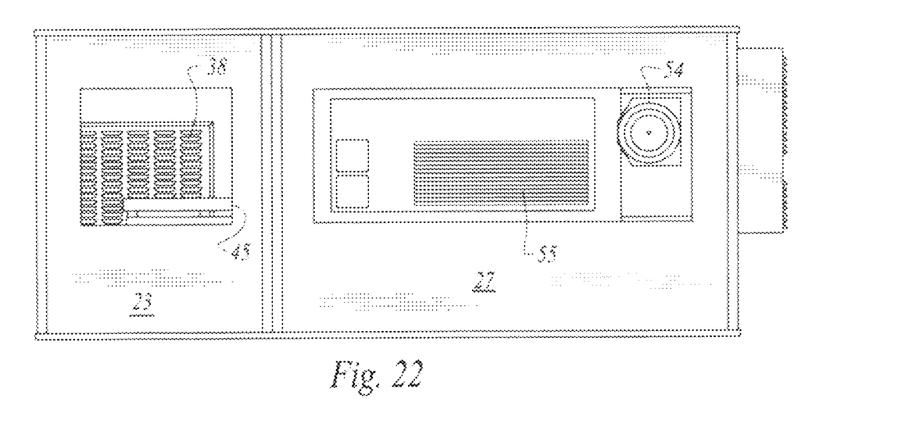
FIG. 22 is a view related to FIG. 21.

The discussion now moves to FIG. 22 Here the two enclosure have been unbolted from the rear walls of their respective compartments. This FIGURE should be viewed in conjunction with FIGS. 18 and 19 for full understanding. In rear wall 23 of the transformer compartment one sees part of the transformer 45 and the louvers 38 of the interior surface of the inside door. See FIG. 18. The main circuit breaker 50 and its mount beams have been removed for ease of seeing the louvers aforementioned.

In the opening from which enclosure 28 was removed one can see cooling fan 54 and the large heat sink 55.

Figure 23:
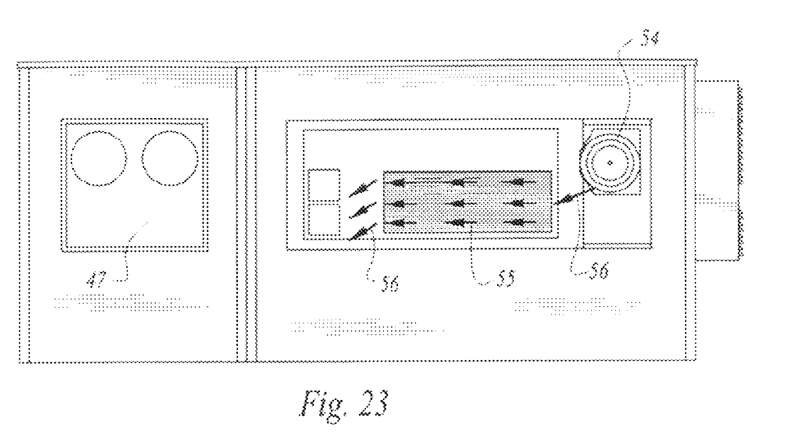
FIG. 23 is a rear elevational view of this cabinet with the rear enclosures removed.

FIG. 23 is related to FIG. 22 in that for the larger compartment, the airflow is illustrated by arrows 56 which move from the side throat of the heat sink fan 54, across the heat sink 55. Whereas in the left compartment of the transformer the mount board 47 for the two 11 inch fans has been put back in place, per FIG. 19.

Thus the apparatus aspect of the invention which relates to the modification of the Tesco Controls Nema 3R cabinet has been completed. The discussion now moves to the process aspect of this intention.

Process for Cooling Instrument Locations

As noted above the object of this invention is to create a storage cabinet for the variable frequency drive, such that no refrigeration is required to permit the apparatus to operate in the exterior within a large operating temperature parameter. Thus this apparatus must be able to operate without in the heat of Palm Desert Calif. or the cold of Truckee Calif. in the high Sierra mountains at about 7000 feet elevation.

Determine the high temperature operating parameter for determining cooling requirements and the low temperature operating parameter to determine if any insulation within the cabinet compartments will be needed for the VFD and transformer of choice.

Thus the first step is to determine the cubic footage of the VFD compartment and the cubic footage of the transformer compartment. Next, calculate the space occupied by the components present in each of the two compartments.

Third, calculate the airflow around the components in each compartment based on the scfm (Standard cubic foot per minute) characteristics of the blower fans available for installation in the cooling enclosures attached at the rear of each compartment. Then fourth, estimate the direction of airflow of each item in the two compartments, and then based on these calculations, one builds a proposed cabinet structure with cooling enclosures for the cooling components.

Next, $5^{th}$, install and electrically connect (hookup) any needed test equipment to measure the CFM airflow in the various areas of the two compartments. In addition one can use a smoke test to watch and observe the airflow by first installing an acrylic plastic or polycarbonate window.

The $6^{th}$ step is to measure the temperatures in the two compartments at various locations within each compartment. Then place and install and electrically connect the cooling components such as blower fans and heat syncs in the cooling enclosures to be attached to the rear of each compartment. The actual size of the cooling enclosure is determined from the cooling components to be used, not vice versa.

In order to confirm our beliefs concerning the calculations of what equipment was needed to cool the VFD and transformer properly to operate within the desired temperature parameters, we shipped the cabinet with the VFD and transformer in their respective compartments to an outside laboratory The test was conducted at 122 degrees F. using an FLA (Full load amps) of 619 Amps continuously for 6 hours. After this successful test, a heat trace was run on all critical components in an attempt to achieve a failure. While the heat trace test did not fail, the decision was made to change the configuration of the fan shroud in the VFD compartment to redirect airflow as shown in the FIGURES.

Testing was again carried out at the outside laboratory in Texas, using pre-calibrated instruments, and the cabinets with the VFD and the transformer with their cooling enclosures again passed the operating temperature parameters.

The VFD chassis is cooled by a sealed system heat exchanger while transformer is cooled by systems that employ exhaust fans and heat sinks.

We believe that it is within the skill of the art to carry out the needed calculations for any given size of VFD and transformer to determine what cooling components will be needed, and then construct the cooling enclosure to house the cooling components to operate efficiently within that operating environment.

While it may be within the skill of the art to carry out any and all of the individual calculations, we believe that we were the first to determine how to apply these calculations to find components to cool a VFD that would normally be cooled by refrigeration, and to then build an enclosure to house the cooling components once the cooling components needed were determined.

It can be seen therefore this process can be applied to any VFD and transformer combination, given the desired operating parameter on the hot end of the temperature scale as envisioned by the end user.

Since certain changes may be made in the above described apparatus and process without departing from the scope of the invention herein involved, it is intended that all matter contained in the above description and in the accompanying drawings present, shall be interpreted as illustrative only and not in a limiting sense

We claim:

1. A NEMA 3R housing for a variable frequency drive (VFD), to allow it to operate without refrigeration at extreme temperatures, which housing comprises:
    (A) two compartments, each having a front face and a rear face and one side face, said compartments disposed side by side separated by a common wall, the first of which compartments would souse a variable frequency drive (VFD) and the second of which would house a transformer for the VFD;
    the first compartment having at least one outer door and least one inner door at the front face, and the electrical components necessary to operate the specific VFD under the desired operating conditions disposed in said first compartment;
    the second compartment having an outer door and an inner door on the front face,
    each compartment having enclosures for cooling components disposed on the rear face thereof, which enclosures communicate with openings in the rear face of the respective compartment to provide cooling to each of the VFD and the transformer to be disposed in the respective compartments.

2. In the housing of claim 1, wherein the second compartment has a main circuit breaker mounted therein.

3. In the housing of claim 2, wherein the main circuit breaker is electrically connected, such that opening of any inner door present will shut down the VFD and the transformer.

4. In the housing of claim 1 wherein in one inner door of the at least one inner door of the first compartment, there is a recessed chamber with its own chamber door thereon, said recessed chamber having some of the electrical components for the operation of the VFD disposed therein.

5. In the housing of claim 4 wherein the door of the recessed chamber has controls for the electrical components mounted thereon.

6. In the housing of claim 1 wherein cooling components are disposed in each of the enclosures, and said enclosures Lave downward facing louvers therein for hot air exhaustion.

7. In the housing of claim 6, wherein the cooling components in the first compartment's enclosure comprise a heat sink and a heat sink fan.

8. In the housing of claim 6, wherein the cooling components in the second compartment's enclosure comprise a pair of fans.

9. In the housing of claim 1, further including an additional enclosure having louvers therein, said additional enclosure disposed on the side face of the first compartment, being in fluid communication with an opening in said side face to provide additional cooling to a VFD.

10. In the housing of claim 1 wherein the transformer second compartment's outer door has an inside surface and an outside surface, said outside surface having a set of downward facing louvers therein.

11. In the housing of claim 10, wherein the second compartment's outer door has a set of upward facing louvers mounted on the inside surface of the outer door, spaced from said inside door surface and in fluid communication with the downward facing louvers on the outer surface of the outer door to permit airflow but to inhibit rain entry.

12. In the housing of claim 1, further including an additional enclosure having louvers therein, said additional enclosure disposed on the side face of the first compartment, being in fluid communication with an opening in said side face to provide additional cooling to a VFD said additional enclosure having a cooling component operatively connected therein.

13. In the housing of claim 12 wherein the cooling component of the additional enclosure is a heat sink.

14. In the housing of claim 1, wherein the first compartment has at least one back panel for the mounting of electrical components.

15. In the housing of claim 3 wherein the main circuit breaker is mounted on at least one cross beam disposed between the side walls of the second compartment and positioned away from where the transformer would be and distant from the cooling components of said second compartment.

16. In the housing of claim 9 wherein the enclosures on the rear faces of the two compartments have louvers that face down, on all vertical faces of each enclosure.

17. A NEMA 3R housing for a variable frequency drive (VFD), to allow it to operate without refrigeration at extreme temperatures, which housing comprises:
    (A) two compartments, each having a front face and a rear face and one side face, said compartments disposed side by side separated by a common wall, the first of which compartments would house a variable frequency drive (VFD) and the second of which would house a transformer for the VFD;
    the first compartment having a pair of opposed opening outer doors and two inner doors at the front, and the electrical components necessary to operate the specific VFD under the desired operating conditions disposed in said first compartment;
    the second compartment having an outer door and an inner door on the front face,
    each compartment having enclosures for cooling components disposed on the rear face thereof, which enclosures communicate with openings in the rear face of the respective compartment to provide cooling to each of the VFD and the transformer to be disposed in the respective compartments.

18. In the housing of claim 17 wherein in one inner door of the pair of opposed opening inner doors of the first compartment, there is a recessed chamber with its own chamber door thereon, said recessed chamber having some of the electrical components for the operation of the VFD disposed therein and farther wherein the door of the recessed chamber has controls for the electrical components mounted thereon.

19. In the housing of claim 18, wherein the second compartment has a main circuit breaker mounted therein and wherein the main circuit breaker is electrically connected, such that opening of any inner door present will shut down a VFD present and a transformer present.

20. In the housing of claim 17 wherein cooling components are disposed in each of the enclosures, and said enclosures have downward facing louvers therein for hot air exhaustion.

21. In the housing of claim 20, wherein the cooling components in the first compartment's enclosure are a heat sink and a heat sink fan and wherein the cooling components in the second compartment's enclosure are a pair of fans.

22. In the housing of claim 17, wherein the cooling components in the first compartment's enclosure comprise a heat sink and a heat sink fan, and wherein the cooling components in the second compartment's enclosure comprise a pair of fans.

23. In the housing of claim 22 further including an additional enclosure having louvers therein, said additional enclosure disposed on the side face of the first compartment, being in fluid communication with an opening in said side face to provide additional cooling to a VFD said additional enclosure having a cooling component operatively connected therein.

24. In the housing of claim 23, wherein the second compartment's outer door has a set of upward facing louvers mounted on the inside surface of the outer door, spaced from said inside door surface and in fluid communication with the downward facing louvers on the outer surface of the outer door to permit airflow but to inhibit rain entry.

25. In the housing of claim 23 wherein the cooling component of the additional enclosure is a heat sync and further wherein the first compartment has at least one back panel for the mounting of electrical components.

26. In the housing of claim 23 wherein the main circuit breaker is mounted on at least one cross beam disposed between the side walls of the second compartment and positioned away from where the transformer would be and distant from the cooling components of said second compartment.

27. In the housing of claim 25 wherein the enclosures on the rear faces of the two compartments have louvers that face down, on all vertical faces of each enclosure.

28. A NEMA 3R housing for a variable frequency drive (VFD), to allow it to operate without refrigeration at extreme temperatures, which housing comprises:
  (A) two compartments, each having a front face and a rear face and one side face, said compartments disposed side by side separated by a common wall, the first of which compartments would house a variable frequency drive (VFD) and the second of which would house a transformer for the VFD;
  the first compartment having a pair of opposed opening outer doors and two inner doors at the front, and the electrical components necessary to operate the specific VFD under the desired operating conditions disposed in said first compartment;
  the second compartment having an outer door and an inner door on the front face,
  each compartment having enclosures for cooling components disposed on the rear face thereof, which enclosures communicate with openings in the rear face of the respective compartment to provide cooling to each of the VFD and the transformer to be disposed in the respective compartments;
  wherein in one inner door of the pair of opposed opening inner doors of the first compartment, there is a recessed chamber with its own chamber door thereon, said recessed chamber having some of the electrical components for the operation of the VFD disposed therein and further wherein the door of the recessed chamber has controls for the electrical components mounted thereon and further wherein the second compartment has a main circuit breaker mounted therein and wherein the main circuit breaker is electrically connected, such that opening of any inner door present will shut down a VFD present and a transformer present;
  and including cooling components disposed in each of the enclosures, and said enclosures have downward facing louvers therein for hot air exhaustion.

29. In the housing of claim 28, wherein the cooling components in the first compartment's enclosure are a heat sink and a heat sink fan and wherein the cooling components in the second compartment's enclosure are a pair of fans.

* * * * *